United States Patent Office 3,520,911
Patented July 21, 1970

3,520,911
METHOD OF MAKING ALCOHOL-SOLUBLE COMPLEXES OF ALUMINUM
John L. Jones, North Plainfield, and Andrew M. Rubino, New Providence, N.J., assignors to Armour Pharmaceutical Company, Chicago, Ill., a corporation of Delaware
No Drawing. Continuation-in-part of application Ser. No. 603,133, Dec. 20, 1966, which is a continuation-in-part of application Ser. No. 472,684, July 16, 1965. This application Oct. 23, 1968, Ser. No. 770,106
The portion of the term of the patent subsequent to Jan. 7, 1986, has been disclaimed
Int. Cl. C07f 5/06; A61k 7/00
U.S. Cl. 260—448         10 Claims

ABSTRACT OF THE DISCLOSURE

The invention is directed to complexes of basic aluminum hydroxide and a polyhydroxy compound, having at least 2 carbon atoms, each of which is linked to a hydroxy group to form a mixture, with the water content being between 4.0 to about 10 weight percent determined by Karl Fischer analysis, and with the ratio of atomic aluminum per mol of polyhydroxy compound in the complex being between about 1.4 to 2.2 atoms of aluminum per mol of polyhydroxy compound. In the method of the subject invention an aqueous mixture of basic aluminum chloride and polyhydroxy compound having a ratio of 0.8 to 2.20 atoms of aluminum per mol of polyhydroxy compound is dried to yield the final complex.

---

The present invention is directed to a method of making alcohol-soluble complexes of aluminum and to such alcohol-soluble complexes. In particular, the present invention is directed to the method of making alcohol-soluble complexes of superior utility for use in aerosol compositions.

The subject application is a continuation-in-part of United States patent application Ser. No. 603,133 filed Dec. 20, 1966 entitled: Method Of Making Alcohol Soluble Complexes Of Aluminum And Preparations Employing The Complexes, now Pat. 3,420,932 issued Jan. 7, 1969. Such patent application Ser. No. 603,133 is a continuation-in-part of our patent application Ser. No. 472,684 filed July 16, 1965, now abandoned. The text of patent application Ser. No. 603,133 is incorporated herein by reference.

Patent application Ser. No. 603,133 is directed to a method of preparing an inorganic-organic coordinated complex of aluminum by mixing an aqueous solution of an aluminum-containing material, such as aluminum basic chloride, with a polyhydroxy compound, having at least 2 carbon atoms, each of which is linked to a hydroxy group, to form a mixture, followed by the heating of said mixture, and subsequent drying to yield the complex which has a water content of from about 1.0 to about 10 weight percent determined by Karl Fischer analysis.

The complex derived by the method of patent application Ser. No. 603,133 has great utility in anhydrous alcohol aerosol formulations used as antiperspirants. Thus, the complexes derived by the method of patent application Ser. No. 603,133 are both reasonably soluble in anhydrous alcohol, and reasonably compatible with the available aerosol propellants, such as the halogenated (fluoro chloro) hydrocarbons. While these complexes are satisfactory for usage in aerosol containers, yet it has proved desirable to achieve complexes which are more soluble in anhydrous alcohol and more compatible with the propellant. Increased solubility in anhydrous alcohol enables more concentrated aerosol formulations to be prepared. The use of anhydrous alcohol enables much of the extreme corrosion induced by aqueous media to the metal valves and containers for the aerosol preparation to be avoided.

Maximum compatibility with aerosol dispenser propellants is most desirable so as to minimize valve clogging and other impairment of the aerosol dispenser function.

This invention has an object the provision of alcohol soluble complexes of aluminum which possess both increased solubility in anhydrous alcohol, and improved compatibility with aerosol propellants.

This invention has a further object the provision of the aforesaid alcohol soluble complexes of aluminum.

Other objects will appear hereinafter.

We have discovered that there is an optimum ratio of atoms of aluminum per mol of polyhydroxy compound in the finished complex, which confers upon the complex increased solubility in anhydrous alcohol and improved compatibility with aerosol propellants. Specifically, we have determined that prior to spray drying a ratio of between 0.8 to 2.20 atoms of aluminum per mol of polyhydroxy compound should be maintained in the reaction mixture. In the final spray-dried product, the solid should contain between 1.4 to 2.2 atoms of aluminum per mol of polyhydroxy compound, with a ratio of about 1.65 to 1.9 atoms of aluminum per mol of polyhydroxy compound in the final product being optimum.

The preferred coordination compounds (complexes) of the present invention have the formula:

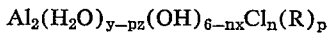

wherein R is the coordinating moiety of a polyhydroxy compound having a carbon chain in which at least two carbon atoms link a hydroxyl group to said chain; $y$ is from 2 to 6 and need not be a positive integer; $p$ is the number of mols of the polyhydroxy compound and need not be a positive integer; $z$ is the number of available coordination positions occupied by R; $n$ is 1 to 4 but need not be a positive integer; and $x$ is 1, with $nx$ being from 2 to 4.

The aforesaid formula should not be interpreted as meaning that only water is displaced by R, since R could also displace any OH which are bound to the aluminum atoms. This could also occur, inter alia, by virtue of the condensation of the polyol hydroxy groups with the hydroxy groups bonded to the aluminum atoms. Where more than one hydroxy group of a given polyol molecule condenses with the hydroxy groups bonded to aluminum, chelate structures may be formed. Still other mechanisms can be postulated.

The optimum coordination compounds (complexes) of the present invention have the formula:

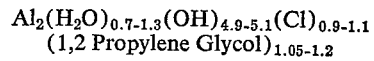

In the above formula, the 1,2 propylene glycol may be present in the complex in a number of ways, namely with both carbinol hydrogen atoms being lost by condensation or neutralization, or with only one carbinol hydrogen atom being lost by condensation or neutralization, or with both hydroxy groups remaining intact and coordinated and/or chelated to one of the aluminum atoms.

As used herein, the term "basic aluminum chloride," refers to those compounds having the formula:

$$Al_2(OH)_xCl_y$$

wherein: $x$ is a positive integer of from 2 to 5; $y$ is a positive integer of from 1 to 4; $x$ and $y$ will always total 6. Representative of the aluminum basic chlorides herein contemplated are:

$$Al_2(OH)_2Cl_4;\ Al_2(OH)_4Cl_2,Al_2(OH)_5Cl$$

The term "polyhydroxy compound" as used herein, means those organic compounds containing two or more hydroxy groups (prior to condensation) linked to adjacent or non-adjacent carbon atoms. We specifically intended to include, although not be limited to, dihydric and polyhydric alcohols.

Other terms which may require specific definition will be defined herein as the need arises. In every instance, it is intended that all terms which are specifically defined herein shall carry such definitions whenever and however used and that all other terms will be accorded their art-accepted meaning within the context in which they are used.

Suitable polyhydroxy compounds for use in the practice of the present invention include: propylene glycol; 1,1,1 - trimethylol propane; 1,3 - butylene glycol (1,3-butane-diol); glycerin (1,2,3 - trihydroxy propane); 2-methyl-2,4-pentane-diol; neopentyl glycol (2,2-dimethyl-1,3 - dihydroxy pentane); polyethylene glycol (mol. wt.=400); Polyglycol 16–200 (a Dow material having an ethereal linkage between propylene oxide and ethylene and condensed with glycerine in which each chain has a terminal hydroxy group (mol. wt.=2700)); p-xylene-α,α-diol; and polyepichlorohydrin: butyne-1,4 diol; 2-ethyl-1,3-hexane-diol; and polypropylene glycol (av. mol. wt.=400).

The preferred polyhydroxy compound is 1,2- propylene glycol. In addition, we have obtained superior products with 1,3-butane diol, and with trimethylolpropane.

In one embodiment of the present invention, we are able to modify aluminum chlorohydroxide to obtain a coordination compound of superior properties.

Specifically, we prepared an aqueous solution of aluminum chlorohydroxide (obtained from the Reheis Chemical Co., a division of Armour Pharmaceutical Company, trademark "Chlorhydrol") ranging from 43–50 percent solids and to this solution, added from about 53 to about 100% of 1,2-propylene glycol (based on the aluminum chlorohydroxide solids content). If speed is desired, the solution can be stirred slightly.

The reaction between the aluminum chlorohydroxide and the polyhydroxy compound should be effected at a temperature within the range of 50 to 120° C. Preferably, the reaction temperature should be of the order of 80 to 110° C. We have found that a temperature range of 90 to 105° C. is optimum. A reaction can be effected in the presence of agitation, such as stirring or other conventional mixing procedures. The time of the reaction is temperature dependent, and operational times may be determined for any specific concentrations and specific starting materials by routine testing within the skill of a worker in the art. Generally, a duration of the order of from a few minutes to several hours constitutes adequate reaction time. In addition to the reaction time being temperature dependent, it is also dependent upon the extent of agitation applied to the mixture.

The coordination compounds of the present invention may be dried by spray drying or by vacuum drying to a product containing between about 4 and 10 weight percent of moisture as determined by the Karl Fischer Assay method.

The spray drying temperatures to be used in the process of the present invention wil vary depending on the size of the spray drier. With the Bowen No. 2 7-foot diameter spray drier and larger, an inlet temperature of 200° to 320° C. can be used, with the preferred inlet temperature being about 225° to 270° C. An outlet temperature range of 100° C. to 160° C. should be used. For laboratory size spray driers, such as a Bowen Flat-Bottom laboratory spray drier (30-inch diameter) an inlet temperature range of the order of 90° C. to 260° C. may be used, with a preferred inlet temperature range of 150° C. to 210° C. With such small size spray driers, an outlet temperature within the range of 80 to 125° C. may be used, with the preferred outlet temperature range being between 100° C. and 120° C.

It has been found that the spray dried product should be cooled as rapidly as possible to a temperature of 50° C. or less.

One system, which has been proven successful, consists of an air conveying system. Product is removed from the drier waste gas stream through a rotary lock valve. The product at a temperature of approximately 100° C. to 160° C. is dropped into an air stream, cooled and conveyed to a final collection point. The conveying air is ambient air that has been cooled to less than 45° F. maximum by a refrigeration system. At the cold temperature, the air is saturated with water vapor. In the process of cooling the hot product, the air is naturally warmed to 70–80° F. with no additional water being added to the air since no additional product drying is occurring. The resultant relative humidity of the air is less than 40%. Any ambient air temperature below 45° F. is advantageous due to the lower relative humidity after being heated. The temperature of the final product is dependent upon the air flow rate. A flow rate of approximately 10% of the total drier air flow rate cools the product to 80° F. with a 45° F. inlet temperature. If the spray dried product is not cooled as rapidly as possible, then deterioration sets in, and in particular, impaired solubility in anhydrous alcohol, and reduced compatibility with aerosol propellants, such as fluorohydrocarbons results.

In connection with vacuum drying, such vacuum drying should be achieved at a temperature of 65 to 120° C., a vacuum of the order of 7 millimeters of mercury up to atmospheric pressure, and a drying time of 1 hour to 100 hours. When all of the water has been removed, further heating may produce decomposition (this will vary depending on the complex and on the temperature). Examples of vacuum, temperature and time include a vacuum of 7 millimeters mercury, a temperature of 70° C. and a drying time of 1 hour; and a vacuum of 25 millimeters of mercury, a temperature of 90 to 95° C. and a drying time of 5 hours. The more rapid the drying, under the lowest pressures gives a more soluble in anhydrous alcohol and more compatible product.

Spray drying is normally superior to vacuum drying, although the more rapid vacuum drying approaches the results obtained by spray drying.

As above-indicated the range of water as determined by the Karl Fischer Assay method in the final product should be of the order of 4 to 10 weight percent. Preferably, it should be of the order of about 4½ to 8%, with about 6 weight percent being optimum.

In all cases, an excess of polyhydroxy compound should be used to prepare the coordination compounds of the present invention, since a significant amount of polyhydroxy compound is lost by evaporation (such evaporated polyhydroxy compound can be recovered by condensation). The evaporation of the polyhydroxy compound occurs during refluxing, although where spray drying forms the drying method, a major portion of the evaporated polyhydroxy compound is lost during the spray drying. When spray drying is used, account must be taken of the polyhydroxy compound that is lost on evaporation. The amount lost on evaporation will depend on the relative volatility of the glycol and the spray drying or vacuum drying conditions. Under near static conditions (vacuum drying), the loss of volatile materials is dependent primarily on temperature and pressure. Under nonstatic conditions (spray drying), temperature and pressure have an effect, but not nearly as much as the air velocity.

Where glycol losses of 30–50% may be encountered during spray drying, only 5 to 10% may be involved in a vacuum drying process. Or put in another manner, starting with an Al/P.G.[1] ratio of 1.1 and spray drying, we obtain a product with a ratio of about 1.9. In order to obtain a vacuum dried product with a ratio of about 1.93, it was necessary to start with a 1.8 Al/P.G. ratio. The loss is not proportional for all vacuum or spray dried products. It would depend on concentration of reactants, ratio of reactants, temperature, pressure and air velocity.

The nature of these complexes is such that rapid drying (i.e. spray drying) favors rapid solubility and improved compatibility with aerosol propellant. The reason for this is not known but probably has something to do with structure. Small particle sizes with an expanded, porous structure favor rapid solubility. As far as compatibility is concerned, we believe that the rapid drying and decreased exposure to excessive temperature allow the glycol to displace some water but remain in an outer sphere around the aluminum nucleus. Since glycol is more compatible with fluorocarbons than the oxide or water, the product is improved. On exposure to excessive heat, the glycol may tend to migrate internally and expose more water or oxide to the outer sphere and thereby decrease compatibility.

Even if the above postulation is not true, these effects are observed. For this reason, vacuum drying in general has never produced equivalent products to spray dried products. However, if the drying is done under a high vacuum and a relatively thin film condition such that low temperatures can be used and there is no prolonged exposure to heat, the products will approach those obtained by spray drying.

For this reason, it is necessary to start off with an excess amount of glycol, since if the stoichiometric amount of glycol is used initially, the correct ratio of glycol to aluminum will not be achieved in the final product. During spray drying, glycol and water are the only materials being removed. Thus, for example, we can commence with a ratio of 0.95 mol of aluminum per mol of propylene glycol and get a final product which contains a ratio of about 2 mols of aluminum per mol of propylene glycol.

Produced in the manner indicated, the complex (that is, the "dry" product) exhibits antiperspirant properties which compare favorably by subject evaluation to aluminum chlorohydroxide. This effect is believed to result from our retention of the ionicity of the aluminum in our complex.

While the exact mechanism of the reaction is not fully understood, it is believed to involve the displacement of free and bound water and, possibly, a displacement or condensation with hydroxy groups attached to the aluminum ion. The hydroxy groups of the polyhydroxy compound appear to be unreactive with the chloride ion. As will appear, the substitution of glycerine and similar polyhydroxy compounds for the propylene glycol described above provides coordination compounds of similar solubility in non-aqueous media. This, as will be shown, is true for many other polyhydroxy compounds.

[1] P.G. is propylene glycol.

EXAMPLE 1

An aqueous solution containing 980.5 g. of 50% basic aluminum chloride and 19.5 g. of 32° Be. $AlCl_3$ was refluxed at 100–105° C. for a period of 4.0 hours. To the solution was added 416 g. of propylene glycol such that molar ratio of Al/P.G. was about 0.85. The solution was concentrated with heat to a net weight of 1117 g. (viscosity=173 cps.). The cooled solution was spray dried in a 30" Bowen Flat Bottom Spray Dryer at an outlet temperature of 245° F.

Assay: 19.45% Al, 13.45% Cl, 6.6% $H_2O$ by Karl Fischer, 34.3% Propylene glycol, Al/P.G.=1.6

Solubility in anhydrous SD–40>50%; Compatibility=257 cc. $CCl_4$ [1]

EXAMPLE 2

A solution containing 980.5 g. of a 50% aqueous basic aluminum chloride and 19.5 g. of 32° Be. $AlCl_3$ was allowed to reflux at 100–105° C. for a period of 4.0 hours. To the solution was added 312 g. of U.S.P. propylene glycol such that the molar ratio of Al/P.G. was about 1.10. The solution was concentrated with heating to a net weight of 1025 g. (viscosity=183 cps.). The cooled concentrate was spray dried in a 30" Bowen Flat Bottom Spray Dryer at an outlet temperature of 245° F. Assay: 20.5% Al, 14.0% Cl, 6.4% $H_2O$, 30.3 propylene glycol, Al/P.G.=1.91.

Solubility in anhydrous SD–40>50%; Compatibility=328 cc. $CCl_4$.

From the foregoing it becomes apparent that new and novel complexes (coordination compounds) and methods of preparing them as well as methods and formulations for utilizing them as antiperspirants and especially, though not exclusively, as aerosol dispensed antiperspirants, has been herein described and illustrated which fulfill all of the aforestated objectives and research goals to a remarkably unexpected extent. It is, of course, understood that this description and accompanying examples are presented for illustrative purposes only and not by way of limitation and that such modifications, alterations and applications as may readily occur to the artisan confronted with this disclosure are included within the spriit of this invention, especially as it is defined by the scope of the claims appended hereto.

It is claimed:

1. The method of preparing an inorganic-organic coordinated complex of aluminum comprising mixing an aqueous solution of basic aluminum chloride with a polyhydroxy compound, having at least two carbon atoms, each of which is linked to a hydroxy group, to form a mixture; heating said mixture at a temperature of between about 50° to 120° C., with the ratio of atoms of aluminum per mol of polyhydroxy compound in said heated mixture being between 0.8 to 2.20 atoms of aluminum per mol of polyhydroxy compound; and drying said mixture to obtain a product having a water content of from about 4.0 to about 10 weight percent determined by Karl Fischer analysis, and a ratio of between 1.4 to 2.2 atoms of aluminum per mol of polyhydroxy compound, said product being said complex.

2. A method in accordance with claim 1 in which the drying is spray drying at atmospheric pressure at a temperature of 80° C. to 320° C.

3. A method in accordance with claim 2 in which spray drying is maintained so that the product has a ratio of between about 1.65 to about 1.9 atoms of aluminum per mol of polyhydroxy compound.

4. A method in accordance with claim 2 in which the aqueous solution is heated to a temperature of between about 80° to 110° C.

[1] Defined by the number of cc.'s of $CCl_4$ which will impart a permanent haxe into an agitated alcoholic solution, a measure of compatibility with aerosol propellants, e.g. fluoro (chloro) hydrocarbons.

5. A method in accordance with claim 2 in which the basic aluminum chloride is $Al_2(OH)_5Cl$.

6. A method in accordance with claim 2 in which the polyhydroxy compound is 1,2 propylene glycol.

7. A method in accordance with claim 2 in which the polyhydroxy compound is trimethylol propane.

8. A method in accordance with claim 2 in which the polyhydroxy compound is 1,3 butanediol.

9. A method in accordance with claim 2 in which the water content of the product is between 4½ to 8 weight percent determined by Karl Fischer analysis.

10. $Al_2(H_2O)_{0.7-1.3}(OH)_{4.9-5.1}(Cl)_{0.9-1.1}(1,2 \text{ propylene glycol})_{1.05-1.20}$

References Cited
UNITED STATES PATENTS

| | | | |
|---|---|---|---|
| 2,466,445 | 4/1949 | Landau | 260—448 |
| 2,823,169 | 2/1958 | Brown et al. | |
| 2,872,379 | 2/1959 | Neumann et al. | |
| 3,359,169 | 12/1967 | Slater et al. | |
| 3,420,932 | 1/1969 | Jones et al. | |

TOBIAS E. LEVOW, Primary Examiner

H. M. S. SNEED, Assistant Examiner

U.S. Cl. X.R.

260—999